United States Patent
Lee et al.

(10) Patent No.: US 7,372,903 B1
(45) Date of Patent: May 13, 2008

(54) APPARATUS AND METHOD FOR OBJECT BASED RATE CONTROL IN A CODING SYSTEM

(75) Inventors: Hung-Ju Lee, Robbinsville, NJ (US); Tihao Chiang, Plainsboro, NJ (US)

(73) Assignee: MediaTek, Inc., Hsin Chu (TW)

( * ) Notice: Subject to any disclaimer, the term of this patent is extended or adjusted under 35 U.S.C. 154(b) by 0 days.

(21) Appl. No.: 09/401,132

(22) Filed: Sep. 22, 1999

Related U.S. Application Data

(63) Continuation of application No. 09/094,645, filed on Jun. 15, 1998, now Pat. No. 6,023,296.

(60) Provisional application No. 60/052,134, filed on Jul. 10, 1997.

(51) Int. Cl.
*H04N 7/12* (2006.01)

(52) U.S. Cl. ............ 375/240; 375/240.01; 375/240.03; 375/240.11; 375/240.12

(58) Field of Classification Search ................ 348/384, 348/390, 400, 401, 402, 405, 419; 375/240, 375/240.01, 240.12, 240.03, 240.11; 382/251, 382/154
See application file for complete search history.

(56) References Cited

U.S. PATENT DOCUMENTS

| | | | |
|---|---|---|---|
| 5,134,476 A * | 7/1992 | Aravind et al. ............. 358/133 |
| 5,144,426 A | 9/1992 | Tanaka et al. | |
| 5,214,507 A | 5/1993 | Aravind et al. | |
| 5,223,926 A * | 6/1993 | Stone et al. ........... 375/240.01 |
| 5,231,484 A * | 7/1993 | Gonzales et al. ........... 358/133 |
| 5,237,410 A | 8/1993 | Inoue | |
| 5,245,427 A | 9/1993 | Kunihiro | |
| 5,253,059 A * | 10/1993 | Ansari et al. ............... 358/138 |
| 5,291,282 A | 3/1994 | Nakagawa et al. | |
| 5,333,012 A | 7/1994 | Singhal et al. | |
| 5,440,345 A * | 8/1995 | Shimoda ..................... 348/411 |
| 5,491,513 A * | 2/1996 | Wickstrom et al. ......... 348/390 |
| 5,566,208 A * | 10/1996 | Balakrishnan .............. 375/240 |
| 5,576,767 A * | 11/1996 | Lee et al. .................... 348/413 |
| 5,594,504 A * | 1/1997 | Ebrahimi .................... 348/416 |
| 5,606,371 A * | 2/1997 | Gunnewiek et al. ........ 348/405 |
| 5,731,835 A | 3/1998 | Kuchibholta | |
| 5,745,178 A * | 4/1998 | Hartung et al. ............. 348/405 |
| 5,764,805 A | 6/1998 | Martucci et al. | |
| 5,790,196 A * | 8/1998 | Sun et al. .................... 348/419 |
| 5,929,914 A | 7/1999 | Normand | |
| 5,933,194 A | 8/1999 | Kim et al. | |
| 6,023,296 A * | 2/2000 | Lee et al. .................... 348/405 |

(Continued)

OTHER PUBLICATIONS

"A New Rate Control Scheme Using Quadratic Rate Distortion Model", T. Chiang and Y-Q. Zhang, IEEE Transactions on Circuits and Systems for Video Technology, vol. 7, No. 1, Feb. 1997, pp. 246-250.*

(Continued)

*Primary Examiner*—Allen Wong
(74) *Attorney, Agent, or Firm*—Andrew D. Fortney

(57) ABSTRACT

A method and apparatus for selecting a quantizer scale for each object within a frame to optimize the coding rate is disclosed. A quantizer scale is selected for each region or "object" within each frame such that the target bit rate for the frame is achieved while maintaining a uniform visual quality over the entire frame.

39 Claims, 5 Drawing Sheets

U.S. PATENT DOCUMENTS 6,055,330 A * 4/2000 Eleftheriadis et al. ...... 382/251
6,112,202 A    8/2000 Kleinberg
6,112,203 A    8/2000 Bharat et al.
6,243,497 B1   6/2001 Chiang et al.

OTHER PUBLICATIONS

[A. Vetro, H. Sun, "Joint Rate Control for Coding Multiple Video Objects Based on Quadratic Rate-Distortion"] JTC1/SC29/WG11 Coding of Moving Pictures and Associated Audio MPEG97/1631 Feb. 17-21, 1997, Sevilla, Spain.*

[S. Ryoo, J. Shin and E. Jang, "Results of Core Experiment"] JTC1/SC29/WG11 Coding of Moving Pictures and Associated Audio MPEG97/1657 Feb. 17-21, 1997, Sevilla, Spain.*

[A. Vetro, H. Sun, "Results of Core Experiment Q2: Comparison of VM and TMN6 Rate Control"] JTC1/SC29/WG11 Coding of Moving Pictures and Associated Audio MPEG97/1797 Feb. 17-21, 1997, Sevilla, Spain.*

[A. Vetro, H. Sun, Joint Rate Control for Coding Multiple Video Objects Based on Quadratic Rate-Distortion JTC1/SC29/WG11 Coding of Moving Pictures and Associated Audio MPEG97/1631 Feb. 17-21, 1997, Sevilla, Spain.

[S. Ryoo, J. Shin and E. Jang, "Results of Core Experiment" JTC1/SC29/WG11 Coding of Moving Pictures and Associated Audio MPEG97/1667 Feb. 17-21, 1997, Sevilla, Spain.

[A. Vetro, H. Sun. "Results of Core Experiment Q2: Comparison of VM and TMN6 Rate Control" JTC1/SC29/WG11 Coding of Moving Pictures and Associated Audio MPEG97/1797 Feb. 17-21, 1997, Sevilla, Spain.

Brin et al.; "The Anatomy of a Large-Scale Hypertextual Web Search Engine", Proc. 7th International World Wide Web Conference, 1998.

Brin et al.; "The PageRank Citation Ranking: Bringing Order to the Web"; Stanford Digital Library Working paper 1998 SIDL-WP-1999-01201 (published 1998).

J.M. Kleinberg; "Authoritative Sources in a Hyperlinked Environment"; Journal of the ACM, vol. 46, No. 5, Sep. 1999, pp. 604-632; Cornell University, NY.

T.H. Haveliwala; "Efficient Computation of PageRank"; SIGMOD Stanford Technical Report, Oct. 18, 1999, Stanford University, CA.

http://www.google.com/technology/index.html "Why Use Google"; Mar. 9, 2001.

Anthony Vetro and Huifang Sun; Joint Rate Control for Coding Multiple Video Objects; IEEE First Workshop on Multimedia Signal Processing; 1997; pp. 181-186; IEEE; New York, New York.

Jordi Ribas-Corbera and Shawmin Lei; Rate Control for Low-Delay Video Communications; ITU Telecommunications Standardization Sector / Study Group 16 / Video Coding Experts Group, Portland, Jun. 24-27, 1997; 27 Pages; Document Q15-A-20 / Filename: q15a20.doc.

Author: Ad Hoc Group on MPEG-4 Video VM Editing; MPEG-4 Video Verification Model Version 7.0; International Organisation for Standardisation, ISO/IEC JTC1/SC29/WG11, Coding of Moving Pictures and Associated Audio Information; MPEG97/N1642, Bristol, UK; Apr. 1997; 271 Pages.

Tihao Chiang and Ya-Qin Zhang; A New Rate Control Scheme Using Quadratic Rate Distortion Model; IEEE Transactions on Circuits and Systems for Video Technology; Feb. 1997; pp. 246-250; vol. 7; No. 1; IEEE.

* cited by examiner

APPARATUS AND METHOD FOR OBJECT BASED RATE CONTROL IN A CODING SYSTEM

This is a continuation of application Ser. No. 09/094,645, filed on Jun. 15, 1998 now U.S. Pat. No. 6,023,296.

This application claims the benefit of U.S. Provisional Application No. 60/052,134 filed Jul. 10, 1997, which is herein incorporated by reference.

The present invention related to an apparatus and concomitant method for optimizing the coding of motion video. More particularly, this invention relates to a method and apparatus that adaptively adjusts a quantizer scale for each region or "object" within a frame to maintain the overall quality of the motion video while optimizing the coding rate.

BACKGROUND OF THE INVENTION

The Moving Picture Experts Group (MPEG) created the ISO/IEC international Standards 11172 and 13818 (generally referred to as MPEG-1 and MPEG-2 format respectively) to establish a standard for coding/decoding strategies. Although these MPEG standards specify a general coding methodology and syntax for generating an MPEG compliant bitstream, many variations are permitted to accommodate a plurality of different applications and services such as desktop video publishing, video conferencing, digital storage media and television broadcast.

In the area of rate control, MPEG does not define a specific method for controlling the bit rate of an encoder. It is the task of the encoder designer to devise a rate control process for controlling the bit rate such that the decoder input buffer neither overflows nor underflows.

Currently, one way of controlling the bit rate is to alter the quantization process, which will affect the distortion of the input video image. By altering the quantizer scale (step size), the bit rate can be changed and controlled.

Although changing the quantizer scale is an effective method of implementing the rate control of an encoder, it has been shown that a poor rate control process will actually degrade the visual quality of the video image, i.e., failing to alter the quantizer scale in an efficient manner such that it is necessary to drastically alter the quantizer scale toward the end of a picture to avoid overflow and underflow conditions. Since altering the quantizer scale affects both image quality and compression efficiency, it is important for a rate control process to control the bit rate without sacrificing image quality.

In the current MPEG coding strategies (e.g., various MPEG test models), the quantizer scale for each frame is selected by assuming that all the pictures of the same type have identical complexity within a group of pictures. However, the quantizer scale selected by this criterion may not achieve optimal coding performance, since the complexity of each picture will vary with time.

Furthermore, encoders that utilize global-type transforms, e.g., wavelet transform (otherwise known as hierarchical subband decomposition), have similar problems. For example, wavelet transforms are applied to an important aspect of low bit rate image coding: the coding of a binary map (a wavelet tree) indicating the locations of the non-zero values, otherwise known as the significance map of the transform coefficients. Quantization and entropy coding are then used to achieve very low bit rates. It follows that a significant improvement in the proper selection of a quantizer scale for encoding the significance map (the wavelet tree) will translate into a significant improvement in compression efficiency and coding rate.

Therefore, a need exists in the art for an apparatus and method that adaptively adjusts a quantizer scale for each region or "object" within a frame to maintain the overall quality of the motion video while optimizing the coding rate.

SUMMARY OF THE INVENTION

The present invention is a method and apparatus for selecting a quantizer scale for each region or "object" within each frame to maintain the overall quality of the video image while optimizing the coding rate. Namely, a quantizer scale is selected for each object within each frame (picture) such that the target bit rate for the picture is achieved while maintaining a uniform visual quality over an entire sequence of pictures.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
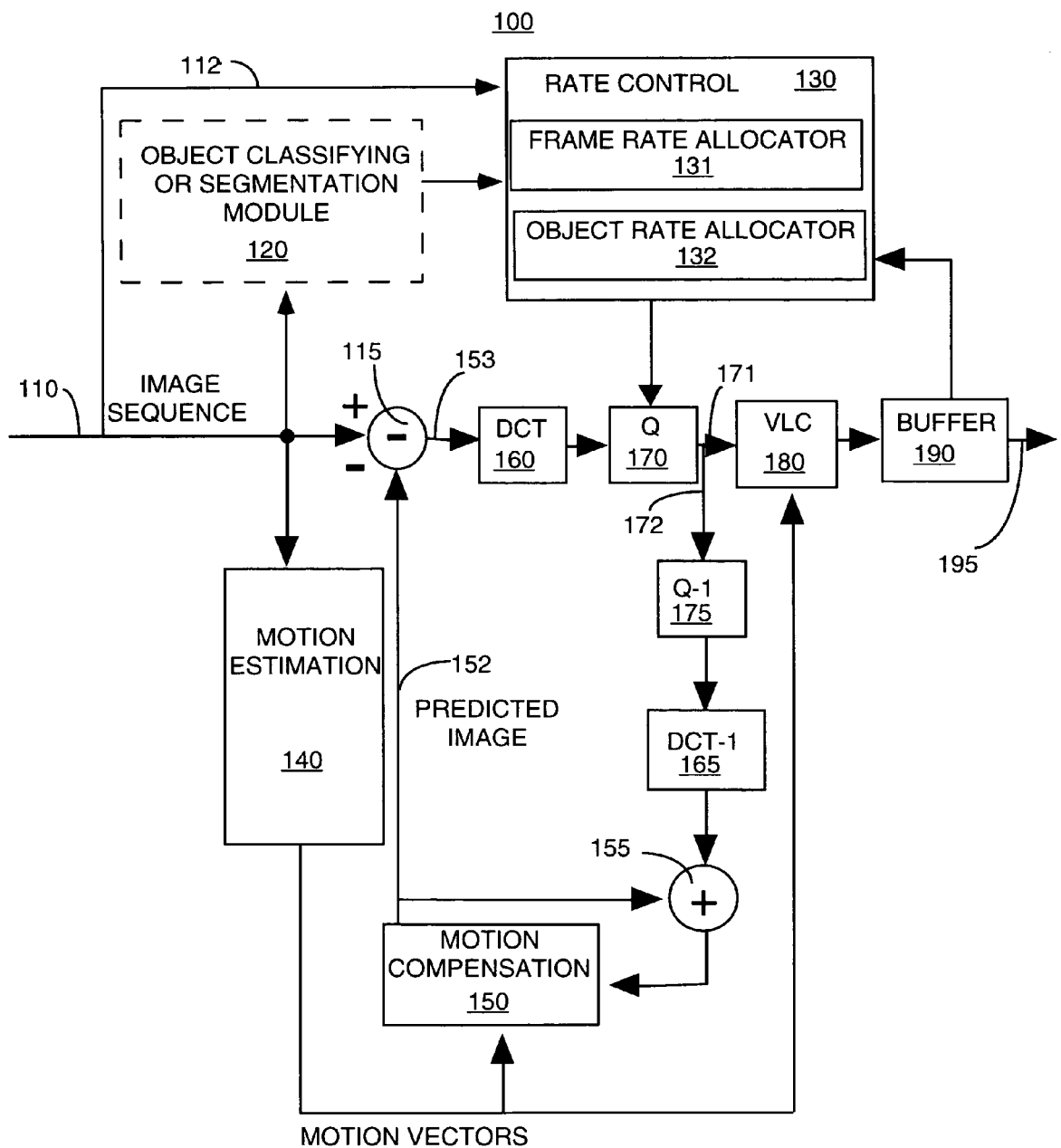
FIG. 1 illustrates a block diagram of the apparatus of the present invention.

FIG. 1 depicts a block diagram of the apparatus 100 of the present invention for deriving a quantizer scale for each "object" within each frame to maintain the overall quality of the video image while controlling the coding rate. Although the present invention is described below with reference to a MPEG compliant encoder, those skilled in the art will realize that the present invention can be adapted to other encoders that are compliant with other coding/decoding standards.

In the preferred embodiment of the present invention, the apparatus 100 is an encoder or a portion of a more complex block-based motion compensation coding system. The apparatus 100 comprises a motion estimation module 140, a motion compensation module 150, a rate control module 130, a DCT module 160, a quantization (Q) module 170, a variable length coding (VLC) module 180, a buffer 190, an inverse quantization ($Q^{-1}$) module 175, an inverse DCT ($DCT^{-1}$) transform module 165, a subtractor 115 and a summer 155. Although the apparatus 100 comprises a plurality of modules, those skilled in the art will realize that the functions performed by the various modules are not required to be isolated into separate modules as shown in FIG. 1. For example, the set of modules comprising the motion compensation module 150, inverse quantization module 175 and inverse DCT module 165 is generally known as an "embedded decoder".

FIG. 1 illustrates an input video image (image sequence) on signal path 110 which is digitized and represented as a luminance and two color difference signals (Y, $C_r$, $C_b$) in accordance with the MPEG standards. These signals are further divided into a plurality of layers (sequence, group of pictures, picture, slice, macroblock and block) such that each picture (frame) is represented by a plurality of macroblocks. Each macroblock comprises four (4) luminance blocks, one $C_r$ block and one $C_b$ block where a block is defined as an eight (8) by eight (8) sample array. The division of a picture into block units improves the ability to discern changes between two successive pictures and improves image compression through the elimination of low amplitude transformed coefficients (discussed below). The digitized signal may optionally undergo preprocessing such as format conversion for selecting an appropriate window, resolution and input format.

The following disclosure uses the MPEG standard terminology; however, it should be understood that the term macroblock or block is intended to describe a block of pixels of any size or shape that is used for the basis of encoding. Broadly speaking, a "macroblock" could be as small as a single pixel, or as large as an entire video frame.

Similarly, it should be understood that the term "object" is intended to describe a block of pixels of any size or shape. Broadly speaking, an "object" could be as small as a single pixel, or as large as an entire video frame.

The input video image on path 110 is received into motion estimation module 140 for estimating motion vectors. A motion vector is a two-dimensional vector which is used by motion compensation to provide an offset from the coordinate position of a block in the current picture to the coordinates in a reference frame. The reference frames can be a previous frame (P-frame), or previous and/or future frames (B-frames). The use of motion vectors greatly enhance image compression by reducing the amount of information that is transmitted on a channel because only the changes between the current and reference frames are coded and transmitted.

The motion vectors from the motion estimation module 140 are received by the motion compensation module 150 for improving the efficiency of the prediction of sample values. Motion compensation involves a prediction that uses motion vectors to provide offsets into the past and/or future reference frames containing previously decoded sample values that are used to form the prediction error. Namely, the motion compensation module 150 uses the previously decoded frame and the motion vectors to construct an estimate of the current frame. Furthermore, those skilled in the art will realize that the functions performed by the motion estimation module and the motion compensation module can be implemented in a combined module, e.g., a single block motion compensator.

Furthermore, prior to performing motion compensation prediction for a given macroblock, a coding mode must be selected. In the area of coding mode decision, MPEG provides a plurality of different macroblock coding modes. Specifically, MPEG-2 provides macroblock coding modes which include intra mode, no motion compensation mode (No MC), frame/field/dual-prime motion compensation inter mode, forward/backward/average inter mode and field/frame DCT mode.

Once a coding mode is selected, motion compensation module 150 generates a motion compensated prediction (predicted image) on path 152 of the contents of the block based on past and/or future reference pictures. This motion compensated prediction on path 152 is subtracted via subtractor 115 from the video image on path 110 in the current macroblock to form an error signal or predictive residual signal on path 153. The formation of the predictive residual signal effectively removes redundant information in the input video image. It should be noted that if a current frame is encoded as an I-frame, then the signal on path 153 is simply the original picture and not a predictive residual signal.

The DCT module 160 then applies a forward discrete cosine transform process to each block of the predictive residual signal to produce a set of eight (8) by eight (8) block of DCT coefficients. The DCT basis function or subband decomposition permits effective use of psychovisual criteria which is important for the next step of quantization.

The resulting 8×8 block of DCT coefficients is received by quantization module 170 where the DCT coefficients are quantized. The process of quantization reduces the accuracy with which the DCT coefficients are represented by dividing the DCT coefficients by a set of quantization values with appropriate rounding to form integer values. The quantization values can be set individually for each DCT coefficient, using criteria based on the visibility of the basis functions (known as visually weighted quantization). Namely, the quantization value corresponds to the threshold for visibility of a given basis function, i.e., the coefficient amplitude that is just detectable by the human eye. By quantizing the DCT coefficients with this value, many of the DCT coefficients are converted to the value "zero", thereby improving image compression efficiency. The process of quantization is a key operation and is an important tool to achieve visual quality and to control the encoder to match its output to a given bit rate (rate control). Since a different quantization value can be applied to each DCT coefficient, a "quantization matrix" is generally established as a reference table, e.g., a luminance quantization table or a chrominance quantization table. Thus, the encoder chooses a quantization matrix that determines how each frequency coefficient in the transformed block is quantized.

However, subjective perception of quantization error greatly varies with the frequency and it is advantageous to use coarser quantization values for the higher frequencies. Namely, human perceptual sensitivity of quantization errors are lower for the higher spatial frequencies. As a result, high frequencies are quantized more coarsely with fewer allowed values than low frequencies. Furthermore, an exact quantization matrix depends on many external parameters such as the characteristics of the intended display, the viewing distance and the amount of noise in the source. Thus, it is possible to tailor a particular quantization matrix for an application or even for an individual sequence of frames. Generally, a customized quantization matrix can be stored as context together with the compressed video image. The proper selection of a quantizer scale is performed by the rate control module 130.

Next, the resulting 8×8 block of quantized DCT coefficients is received by variable length coding (VLC) module 180 via signal connection 171, where the two-dimensional block of quantized coefficients is scanned in a "zig-zag" order to convert it into a one-dimensional string of quantized DCT coefficients. This zig-zag scanning order is an approximate sequential ordering of the DCT coefficients from the lowest spatial frequency to the highest. Variable length coding (VLC) module 180 then encodes the string of quantized DCT coefficients and all side-information for the macroblock using variable length coding and run-length coding.

The data stream is received into a "First In-First Out" (FIFO) buffer 190. A consequence of using different picture types and variable length coding is that the overall bit rate into the FIFO is variable. Namely, the number of bits used to code each frame can be different. In applications that involve a fixed-rate channel, a FIFO buffer is used to match the encoder output to the channel for smoothing the bit rate. Thus, the output signal of FIFO buffer 190 on path 195 is a compressed representation of the input video image on path 110 (or a compressed difference signal between the input image and a predicted image), where it is sent to a storage medium or telecommunication channel via path 295.

The rate control module 130 serves to monitor and adjust the bit rate of the data stream entering the FIFO buffer 190 to prevent overflow and underflow on the decoder side (within a receiver or target storage device, not shown) after transmission of the data stream. Thus, it is the task of the rate control module 130 to monitor the status of buffer 190 to control the number of bits generated by the encoder.

In the preferred embodiment of the present invention, rate control module 130 selects a quantizer scale for each region or "object" within each frame to maintain the overall quality of the video image while controlling the coding rate. Namely, a frame can be evaluated to determine if certain regions within the frame require more or less bit rate allocation. It has been observed that for different applications, various regions are of more interest than other regions, e.g., the face of a person in a video phone application is more important to a human viewer than the background in general. Other examples include medical applications, where certain regions of an image, i.e., a potential tumor is more important than the surrounding tissues or in surveillance applications, where certain regions of an image, i.e., a military assess is more important than the surrounding camouflage, and so on. Thus, the particular application will dictate the criteria that define the importance of relevant regions or objects within a frame. In the present invention, a quantizer scale is selected for each region or object within each frame such that target bit rate for the picture is achieved while maintaining a uniform visual quality over the entire sequence of pictures.

It should be understood that although the present invention is described with an encoder implementing temporal (e.g., motion estimation/compensation) and spatial encoding (e.g., discreet cosine transform), the present invention is not so limited. Other temporal and spatial encoding methods can be used, including no use of any temporal and spatial encoding.

Specifically, the rate control module 130 comprises a frame rate allocator 131 and an object rate allocator 132. The frame rate allocator 131 allocates a bit budget (target frame bit rate) for a current frame, whereas the object rate allocator 132 allocates a bit budget (target object bit rate) for each defined object within the current frame.

In brief, the frame rate allocator 131 initially obtains a rough estimate of the complexity of a specific type of picture (I, P, B) from previously encoded pictures or by implementing various MPEG test models. This estimated complexity is used to derive a predicted number of bits necessary to code each frame. With this knowledge, a quantizer scale is calculated for the frame in accordance with a complexity measure having a polynomial form. This complexity measure is derived to meet the constraint that the selected quantizer scale for the frame should approach the target bit rate for the picture. Once the frame is encoded, the rate control module recursively adjusts the complexity measure through the use of a polynomial regression process. That is, the actual number of bits necessary to code the macroblock is used to refine the complexity measure so as to improve the prediction of a quantizer scale for the next frame. In the course of computing the quantizer scale, the "target frame bit rate" is also recursively updated. This frame rate allocating method was disclosed in patent application entitled "Apparatus And Method For Optimizing The Rate Control In A Coding System", filed on Feb. 11, 1998, with Ser. No. 09/022,349, which is incorporated herein by reference. It should be understood that the present invention can be implemented using other frame bit rate allocating methods, e.g., frame bit rate allocating methods that are based on a distortion measure and the like.

In brief, the object rate allocator 132 then applies the calculated target frame bit rate to determine one or more target object bit rates, where the bits of the target frame bit rate are distributed proportional to the square mean of the absolute differences (MAD) of an object. A detailed description of the target object bit rate and corresponding quantizer scale selection method is discussed below with reference to FIG. 4.

It should be noted that the objects within each frame are determined by an optional object classifying or segmentation module 120. The object classifying or segmentation module 120 contains the necessary criteria to define objects within each frame. Various object classifying or segmentation methods are available, e.g., as described in MPEG-4 standard annex F ISO/IEC 14496-2.

Alternatively, the "object based" information, e.g., which pixel values constitute an object, the location of these pixel values and the like can be obtained directly from the image sequence on path 112. Namely, if the image sequence was previously processed and stored on a storage medium, e.g., a stored video sequence or program on a server, then it is possible that the encoder that generated the stored video sequence may pass along "object based" information. In other words, "object based" information can be transmitted to the encoder 100 along with the image sequence. In such implementation, the object classifying and segmentation module 120 can be omitted.

Returning to FIG. 1, the resulting 8×8 block of quantized DCT coefficients from the quantization module 170 is also received by the inverse quantization module 175 via signal connection 172. At this stage, the encoder regenerates I-frames and P-frames of the input video image by decoding the data so that they are used as reference frames for subsequent encoding.

The resulting dequantized 8×8 block of DCT coefficients are passed to the inverse DCT module 165 where inverse DCT is applied to each macroblock to produce the decoded error signal. This error signal is added back to the prediction signal from the motion compensation module via summer 155 to produce a decoded reference picture (reconstructed image).

Figure 2:
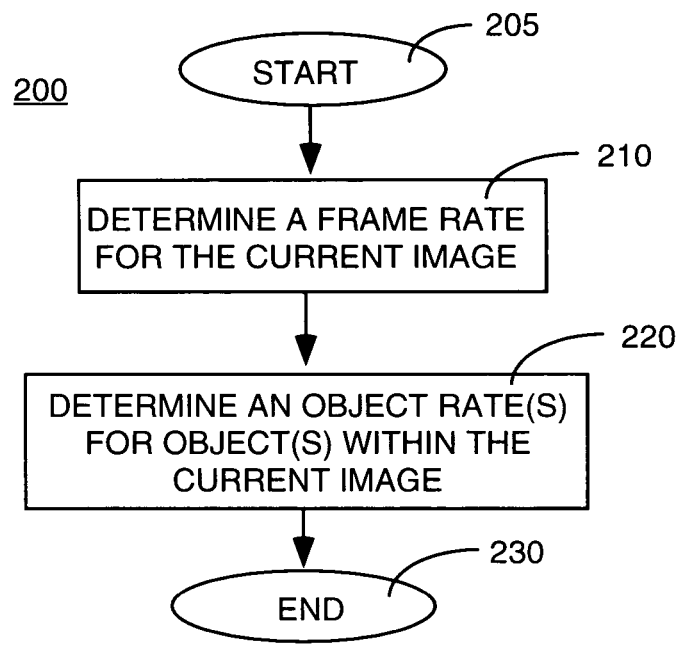
FIG. 2 depicts a block diagram of a flowchart of a method for deriving and allocating the target bit rate for an image based on objects within the image.

FIG. 2 depicts a block diagram of a flowchart of a method 200 for deriving and allocating bits for an image based on objects within the image. More specifically, method 200 starts in step 205 and proceeds to step 210 where a target frame bit rate is determined for a current frame. In the preferred embodiment, the target frame bit rate is determined using a complexity measure that is recursively adjusted through the use of a polynomial regression process (as illustrated in FIG. 3).

Figure 3:
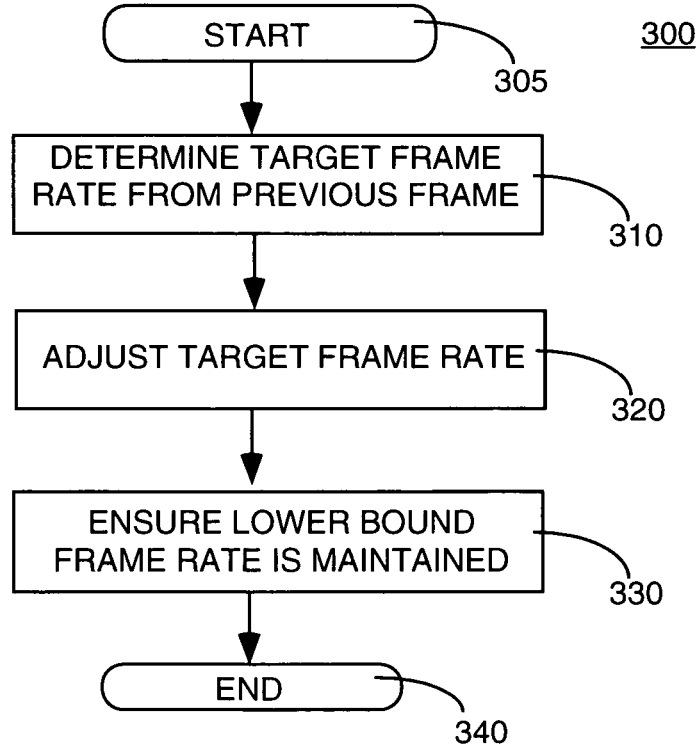
FIG. 3 illustrates a flowchart of a method for determining a target frame bit rate.

FIG. 3 illustrates a flowchart of a method 300 for determining a target frame bit rate. Referring to FIG. 3, the method begins at step 305 and proceeds to step 310, where the method determines the target bits (target frame bit rate) for a frame, $T_{frame}$ as:

$$T_{frame} = \frac{R}{Nf} \times (1 - \text{past\_percent}) + T_{previous\ frame} \times \text{past\_percent} \quad (1)$$

where R is the remaining number of bits for a sequence of frame, Nf is the number of remaining frames in the sequence, $T_{previous\ frame}$ is the number of bits used for encoding the previous frame, and the past_percent is a constant. In the preferred embodiment, the constant past_percent is selected to be 0.05. However, the present invention is not so limited. Other values can be employed, that depend on the specific applications or the context of the images. In fact, these values can be adjusted temporally.

In sum, equation (1) allows the target frame bit rate to be computed based on the bits available and the last encoded frame bits. If the last frame is complex and uses many bits, it leads to the premise that more bits should be assigned to the current frame. However, this increased allocation will diminish the available number of bits for encoding the remaining frames, thereby limiting the increased allocation to this frame. A weighted average reflects a compromise of these two factors, as illustrated in the second term in equation (1).

In step 320, method 300 then adjusts the calculated target frame bit rate, $T_{frame}$ by the current buffer fullness as:

$$T'_{frame} = \frac{(a + c \times b)}{(c \times a + b)} \times T_{frame} \quad (2)$$

where $T_{frame}$ is the adjusted target bit rate, "a" is the current buffer fullness (the portion of the buffer that contains bits to be sent to the decoder), and b is (the physical buffer size—buffer fullness (a)), and c is a constant selected to be a value of 2 (other values can be used). As such "b" represents the remaining space in the buffer. Equation (2) indicates that if the buffer is more than half full, the adjusted target bit rate $T_{frame}$ is decreased. Conversely, if the buffer is less than half full, the adjusted target bit rate $T_{frame}$ is increased. If the buffer is exactly at half, no adjustment is necessary, since equation (2) reduces to $T_{frame} = T_{frame}$.

In step 330, method 300 then optionally verifies that a lower bound of target frame bit rate ($R_s/30$) is maintained as:

$$T_{frame} = \text{Max}(i\ R_s/30, T_{frame}) \quad (3)$$

It should be noted that equation (3) allows $T_{frame}$ to take the greater (max) of two possible values, where $R_s$ is a bit rate for the sequence (or segment), e.g., 24000 bits/sec). Namely, a lower bound of target rate ($R_s/30$) is used to maintain or guarantee a minimal quality, e.g., 800 bits/frame can be set as a minimum. If the minimal quality cannot be maintained, the encoder has the option to skip the current frame altogether. Method 300 then ends in step 340.

It should be understood that other frame bit rate allocation methods can be used, e.g., the MPEG TM4 and TM5, with the present invention. However, since the target object bit rates are derived using the target frame bit rate, the computational overhead and the accuracy of the target object bit rates are affected by the frame bit rate allocation method that is employed. For example, if it is desirable to minimize computational complexity at the expense of performance, then it may be appropriate to employ the frame bit rate allocation methods of MPEG TM4 and TM5. In contrast, if it is desirable to maximize performance at the expense of increasing computational complexity, then it may be appropriate to employ the frame bit rate allocation method of the patent application Ser. No. 09/022,349 or other more complex frame bit rate allocation methods.

Figure 4:
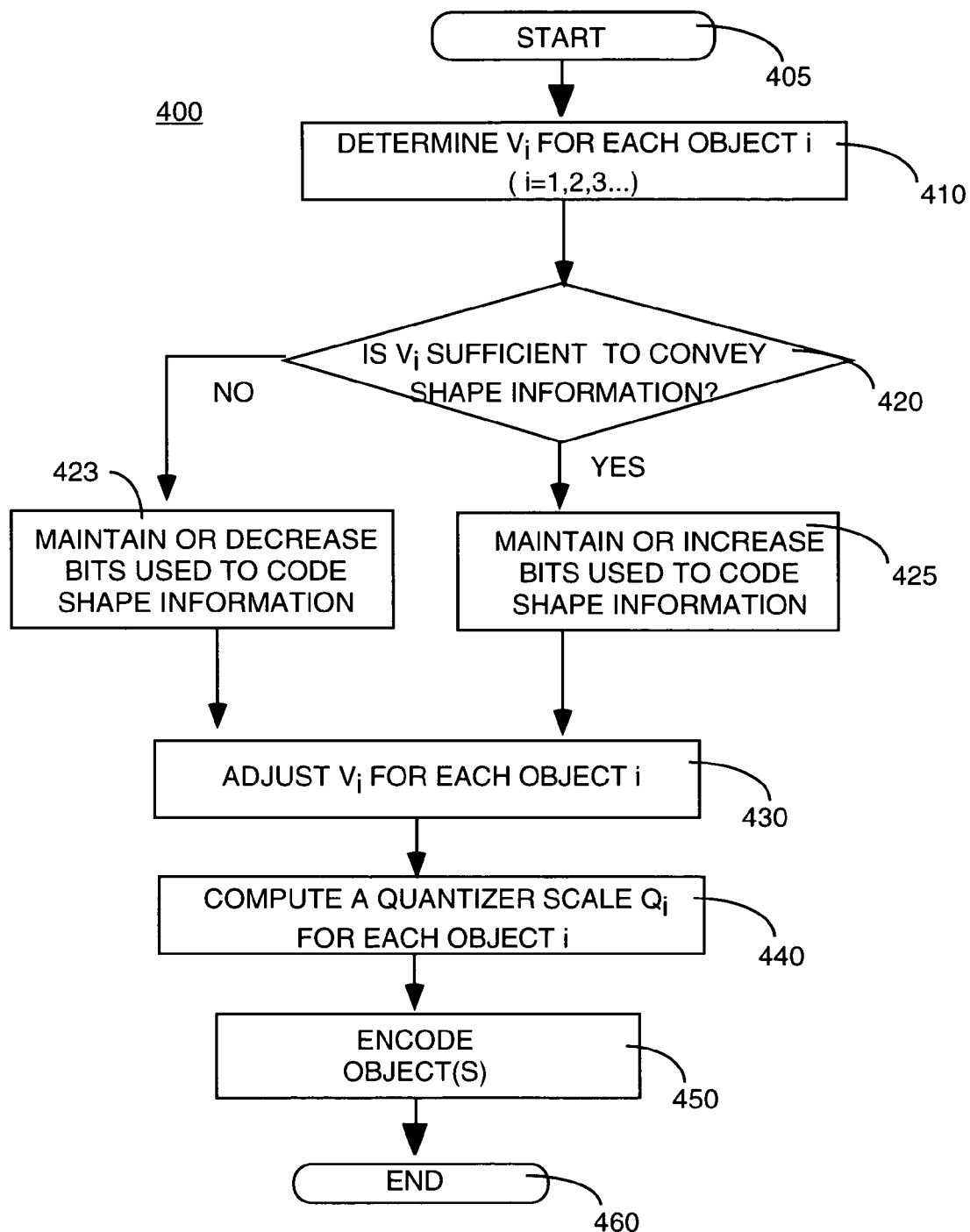
FIG. 4 illustrates a flowchart of a method for determining one or more target object bit rates for the objects within the current image.

Returning to FIG. 2, once $T_{frame}$ is determined, method 200 then determines one or more target object bit rates for the objects within the current image as illustrated in FIG. 4 below. Method 200 then ends in step 230.

FIG. 4 illustrates a flowchart of a method 400 for determining one or more target object bit rates for the objects within the current image. The method starts in step 405 and proceeds to step 410, where target object bit rate, $V_i$, is determined for each object i (i=1, 2, 3 . . . ) as follows $$V_i = K_i \times T_{frame} \quad (4)$$

$$K_i = \frac{(Mad_i)^2}{\sum_{k=i}^{n} (Mad_k)^2} \quad (5)$$

where $Mad_i$ is the mean absolute difference (MAD) of an object i, n is the number of objects in a frame, and $V_i$ is the estimated target object bit rate for object i. Namely, a computation is performed on the entire region or regions that define an "object" in the image to obtain an average pixel value for the object.

More specifically, the absolute difference between each pixel value (in the original image) and the corresponding pixel value (in the predicted image) is performed for pixels defined within the object. Next, the sum of all the absolute differences (SAD) of the pixels for the object is performed. Finally, the SAD is divided by the number of pixels in the object to produce a mean of the absolute difference pixel values (MAD) for the object. Thus, the target frame bits $T_{frame}$ are distributed proportional to the square mean of the absolute differences (MAD) of an object.

For example, if $Mad_a$ for an object "a" is 2 and $Mad_b$ for an object "b" is 3, and $T_{frame}$ is determined to be 100, then $V_a$ and $V_b$ are given respectively as:

$$V_a = \frac{2^2}{2^2 + 3^2} \times 100 \text{ and } V_b = \frac{3^2}{2^2 + 3^2} \times 100.$$

In step 420, method 400 queries whether $V_i$ is large enough to convey the shape information of object i. Namely, the object bits $V_i$ are used to code three sets of information: 1) syntax information (e.g., header information), 2) motion information (motion vectors) for object i and 3) shape information that defines the shape of the object i within the image.

In the preferred embodiment, the shape information is implemented using an "alpha plane" that defines the location of the objects within the image. For example, if the image is defined to have two objects a and b, then the pixel values on the image are quantized by a quantizer to produce an "alpha plane" (in this example, a binary alpha plane) having only values of 0 and 1, where the regions populated by "0s"

represent object "a" and the regions populated by "1s" represent object "b". In turn, an alpha plane can be constructed for an image having more than two objects by quantizing the image into three or more levels and so on.

Thus, the size of the alpha plane is the same as the size of the original image. Thus, a portion of the target object bit rate $V_i$ must be used to convey this shape information to the decoder.

However, to avoid the situation where a significant portion of the target object bits are dedicated toward encoding the motion vectors, and/or the object shape information instead of spending the available bits to code the object context or texture, method 400 employs an object shape control mechanism (a threshold called "alpha_th$_i$") to incrementally or decrementally change the number of bits allocated for shape coding.

More specifically, if the query at step 420 is answered negatively, then method 400 proceeds to step 423, where threshold alpha_th$_i$ is adjusted in accordance with:

if ($V_i \leq$ syntax$_i$+motion$_i$+shape$_i$) then $$\text{alpha\_th}_i = \min(35, \text{alpha\_th}_i + d) \quad (6)$$

where syntax$_i$ represents bits necessary to code syntax information (e.g., header information) for object i; motion$_i$ represents bits necessary to code motion information (e.g., motion vectors) for object i; shape$_i$ represents bits necessary to code shape information for object i; and "d" is a constant set to a value of five (5). The constant "d" can be set to other values depending on the specific application.

Initially, the threshold, alpha_th$_i$, is set to zero for an object i, but once alpha_th$_i$ is established for an object, it is then passed (and possibly modified) from frame to frame. It should be noted that shape$_i$ in equation (6) is initially taken from the corresponding shape$_i$ in the previous frame. This allows method 400 to quickly gauge whether $V_i$ is sufficient to code syntax$_i$, motion$_i$ and shape$_i$, thereby controlling how alpha_th$_i$ is to be adjusted.

In operation, the alpha plane is typically downsampled, e.g., by a factor of 4, to reduce the number of bits that are used to convey the shape information. However, since downsampling is a lossy process, error is introduced as to the location or the boundaries of the objects. Thus, method 400 measures that error by computing a sum of absolute difference SAD$_i$ for each object between the original alpha plane and the downsampled and then unsampled alpha plane. The SAD$_i$ is then compared with alpha_th$_i$ as follows:

If SAD$_i$>(16×alpha_th$_i$), then reduce the downsampling factor.  (6a)

Equation (6a) is then repeated using the new downsampling factor, e.g., a factor of 2, and then the SAD$_i$ is again compared to alpha_th$_i$ using equation (6a) and so on. At some point, SAD$_i$ will be less than the value 16×alpha_th$_i$, at which point, the current downsampling factor is used to generate a bit count for shape$_i$. Thus, changing alpha_th$_i$ affects the number of bits that are allocated for shape information. The constant 16 was experimentally deduced, but this constant may be modified for different application.

More specifically, if the target object bit rate $V_i$ is determined to be smaller than the bits necessary to code syntax$_i$, motion$_i$ and shape$_i$ for the object i in the previous frame, then alpha_th$_i$ is increased by 5. Increasing alpha_th$_i$ reduces the accuracy as to the location of the object i, i.e., distortion is introduced at the boundaries of the object. It should be noted that equation (6) has a maximum (max) function, where alpha_th$_i$ is selected to be the greater of 35 or alpha_th$_i$+5. Thus, in some situations, it may be appropriate to maintain the value of alpha_th$_i$, even if the query at step 420 is answered negatively.

If the query at step 420 is answered affirmatively, then method 400 proceeds to step 425, where threshold alpha_th$_i$ is adjusted in accordance with:

if ($V_i$>syntax$_i$+motion$_i$+shape$_i$) then $$\text{alpha\_th}_i = \max(0, \text{alpha\_th}_i - d) \quad (7)$$

where "d" is a constant also set to a value of five (5). Again, the constant d can be set to other values depending on the specific application. Thus, if the target object bit rate $V_i$ is determined to be greater than the bits necessary to code H$_i$ (i.e., syntax$_i$+motion$_i$+shape$_i$) for the object i in the previous frame, then alpha_th$_i$ is decreased by 5. Decreasing alpha_th$_i$ increases the accuracy as to the location of the object i, i.e., distortion is minimized at the boundaries of the object. It should be noted that equation (7) has a minimum (min) function, where alpha_th$_i$ is selected to be the smaller of 0 or alpha_th$_i$−5.

In step 430, method 400 adjusts $V_i$ in accordance with equations (8a-b) which are expressed as:

if (buffer_fullness+$V_i$)margin) then $$V_i = \text{Max}(R_s/30/\text{number\_of\_objects, margin−buffer\_fullness}) \quad (8a)$$

if (buffer_fullness−$B_{pp}$+$V_i \leq$ SAFETY_MARGIN× buffer_size) then $$V_i = B_{pp} - V_i - \text{buffer\_fullness} + \text{SAFETY\_MARGIN} \times \text{buffer\_size}. \quad (8b)$$

where "margin" is defined as:

$$\text{margin} = \text{ceil}((1.0 - \text{SAFETY\_MARGIN}) \times \text{buffer\_fullness}) \quad (9)$$

where "buffer_fullness" is the current buffer fullness (i.e., the portion of the buffer that contains bits to be sent to the decoder), "SAFETY_MARGIN" is a constant set at 0.1 (other values can be used depending on the application), $R_s$ is a bit rate for the sequence (or segment), "number_of_objects" is the number of objects in the image, "buffer_size" is the size of the buffer, and $B_{pp}$ is the channel output rate. Namely, if method 400 detects the buffer condition defined by equation (8a), then $V_i$ is adjusted lower to a value that is the greater of the bit_rate divided by 30 (a display frame rate for video) divided by the number of objects in the image or the remainder of the space in the buffer, less a portion defined by "margin", i.e., margin-buffer_fullness.

Alternatively, if method 400 detects the buffer condition defined by equation (8b), $V_i$ is adjusted to account for the channel output rate. In sum, $V_i$ is adjusted in accordance with the current state of the buffer, i.e., the fullness of the buffer. At this step, method 400 has completed the task of computing a target object bit rate $V_i$ for each object in the image.

Once $V_i$ for each object in the image is determined, the target object bit rate $V_i$ can be used to effect other coding parameters such as determining a quantizer scale for each object as discussed below. Alternatively, other coding parameters such as allocation of computing resources can be implemented. Namely, if it is determined that a particular object has a high $V_i$, then it is possible to allocate more processing power, e.g., dedicating more processors in a multiple processors coding system in coding a particular object.

Returning to FIG. 4, in step 440, method 400 calculates a quantization scale $Q_i$ for each object i and then encodes the object i in step 450 using the quantization scale $Q_i$. Method 400 then ends in step 460.

In the preferred embodiment, the quantization scale $Q_i$ is calculated in accordance with a distortion measure as described in U.S. patent application with Ser. No. 09/022,349. In brief, the quantization scale $Q_i$ is derived from a quadratic rate-distortion method as expressed below:

$$(R_i - H_i) = X_1 E_i Q_i^{-1} + X_2 E_i Q_i^{-2} \text{ where } \sum_i R_i = T_{frame} \quad (10)$$

where $R_i$ is the actual bits used for object i, $H_i$ is the header bits used for syntax, motion and shape coding, $Q_i$ represents a quantization level or scale selected for the object i, $E_i$ represents a distortion measure. In the preferred embodiment, $E_i$ represents a mean absolute difference for the current object after performing motion compensation. Namely, the measure $E_i$ provides a method of adjusting the object bit budget to account for the difference of the object between successive frames in a sequence. $E_i$ is computed by summing the differences between a current object and the same object in a previous frame from block to block and computing a mean absolute difference measure. In other words, the greater the differences between an object in the current frame and the same object in a previous frame, the greater the number of bits that will be required to code the object in the current frame. Furthermore, other distortion measures can be used, such that $E_i$ may represent mean square error or just-noticeable difference (jnd).

During initialization $R_i$ in equation (10) is substituted with the calculated $V_i$ to generate $Q_i$. However, after actual encoding, $R_i$ and the $Q_i$ are used to update the parameters $X_1$ and $X_2$ using a polynomial regression model or a quadratic regression model to refine the parameters $X_1$ and $X_2$. Namely, the constants $X_1$ and $X_2$ are updated to account for the discrepancy between the bits allocated to an object and the actual number of bits needed to the code the object for a particular quantizer level or scale. Regression models are well known in the art. For a detailed discussion of various regression models, see e.g., Bowerman and O'Connell, *Forecasting and Time Series*, 3rd Edition, Duxbury Press, (1993, chapter 4).

The parameters $X_1$ and $X_2$ are initialized as follows:

$$X_1 = (R_s * N_s)/2$$

$$X_2 = 0 \quad (11)$$

$R_s$ represents the bit rate for the sequence (or segment), e.g., 24000 bits per second. $N_s$ represents the distance between encoded frames. Namely, due to low bit rate applications, certain frames within a sequence may not be encoded (skipped), e.g., the encoder may only encode every fourth frame. It should be understood that the number of skipped frames can be tailored to the requirement of a particular application.

More specifically, before encoding the next frame, the encoder may also examine the current buffer fullness, and the estimated target frame bit rate $T_{frame}$ for the next frame. If the buffer fullness plus the estimated target frame bit rate of the next frame is above 80 percentage of the buffer size, then the next frame will be skipped without encoding, and the buffer fullness will be updated by the channel output rate. The frame skipping condition can be formulated as follows:

if (buffer_fullness+$T_{previous\ frame}$−$B_{pp}$>(buffer_size× skip_margin)

then skip the next frame (12)

where "skip_margin" is a constant set at 0.8 (other values can be used depending on the application). This skipping method is also described in U.S. patent application with Ser. No. 09/022,349.

Although the present invention describes a quantization computation method and a frame skipping method, it should be understood that other quantization computation and frame skipping methods can be used with the present object-based rate control method.

Figure 5:
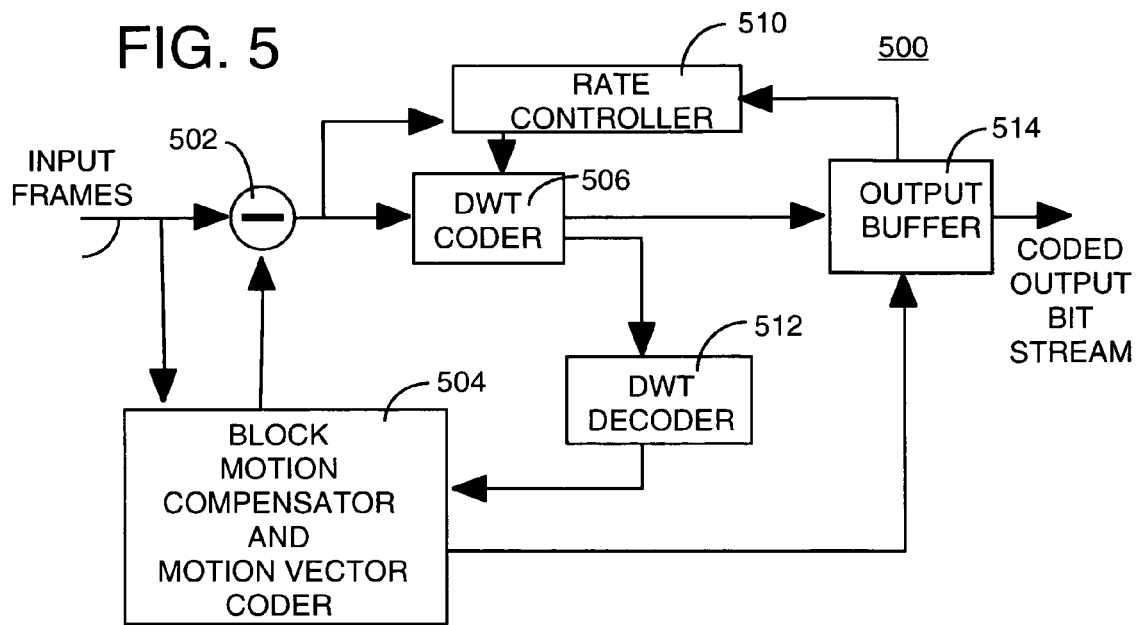
FIG. 5 illustrates a block diagram of a second embodiment of the apparatus of the present invention.

FIG. 5 depicts a wavelet-based encoder 500 that incorporates the present invention. The encoder contains a block motion compensator (BMC) and motion vector coder 504, subtractor 502, discrete wavelet transform (DWT) coder 506, bit rate controller 510, DWT decoder 512 and output buffer 514.

In general, as discussed above the input signal is a video image (a two-dimensional array of pixels (pels) defining a frame in a video sequence). To accurately transmit the image through a low bit rate channel, the spatial and temporal redundancy in the video frame sequence must be substantially reduced. This is generally accomplished by coding and transmitting only the differences between successive frames. The encoder has three functions: first, it produces, using the BMC and its coder 504, a plurality of motion vectors that represent motion that occurs between frames; second, it predicts the present frame using a reconstructed version of the previous frame combined with the motion vectors; and third, the predicted frame is subtracted from the present frame to produce a frame of residuals that are coded and transmitted along with the motion vectors to a receiver.

Figure 6:
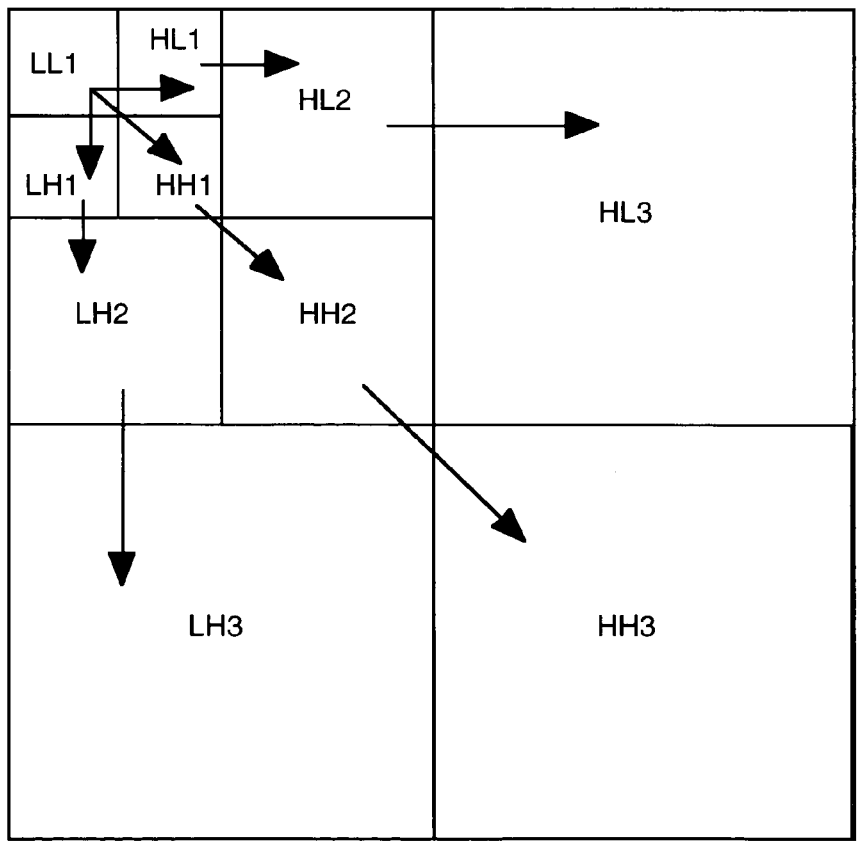
FIG. 6 is a graphical representation of a wavelet tree.

The discrete wavelet transform performs a wavelet hierarchical subband decomposition to produce a conventional wavelet tree representation of the input image. To accomplish such image decomposition, the image is decomposed using times two subsampling into high horizontal-high vertical (HH), high horizontal-low vertical (HL), low horizontal-high vertical (LH), and low horizontal-low vertical (LL), frequency subbands. The LL subband is then further subsampled times two to produce a set of HH, HL, LH and LL subbands. This subsampling is accomplished recursively to produce an array of subbands such as that illustrated in FIG. 6 where three subsamplings have been used. Preferably six subsamplings are used in practice. The parent-child dependencies between subbands are illustrated as arrows pointing from the subband of the parent nodes to the subbands of the child nodes. The lowest frequency subband is the top left $LL_1$, and the highest frequency subband is at the bottom right $HH_3$. In this example, all child nodes have one parent. A detailed discussion of subband decomposition is presented in J. M. Shapiro, "Embedded Image Coding Using Zerotrees of Wavelet Coefficients", IEEE Trans. on Signal Processing, Vol. 41, No. 12, pp. 3445-62, December 1993.

The DWT coder of FIG. 5 codes the coefficients of the wavelet tree in either a "breadth first" or "depth first" pattern. A breadth first pattern traverse the wavelet tree in a bit-plane by bit-plane pattern, i.e., quantize all parent nodes, then all children, then all grandchildren and so on. In contrast, a depth first pattern transverse each tree from the root in the low-low subband (LL$_1$) through the children (top down) or children through the low-low subband (bottom up). The selection of the proper quantization level by the rate controller 510 is an discussed above to control the bit rate for each object within each frame of a sequence. As such, the present invention can be adapted to various types of encoders that use different transforms.

Figure 7:
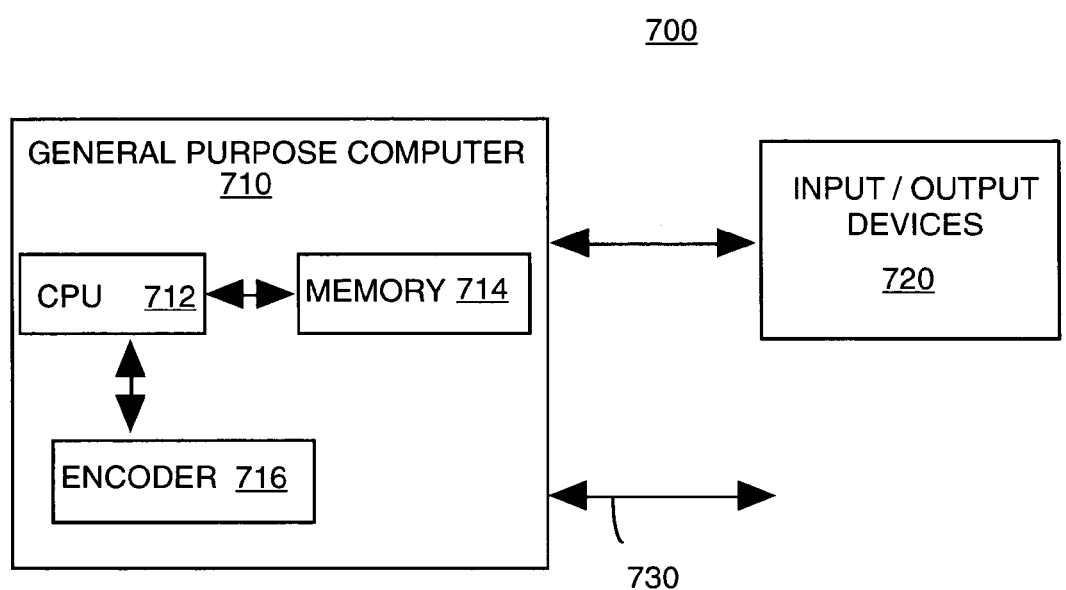
FIG. 7 illustrates an encoding system of the present invention.

FIG. 7 illustrates an encoding system 700 of the present invention. The encoding system comprises a general purpose computer 710 and various input/output devices 720. The general purpose computer comprises a central processing unit (CPU) 712, a memory 714 and an encoder 716 for receiving and encoding a sequence of images.

In the preferred embodiment, the encoder 716 is simply the encoder 100 and/or encoder 500 as discussed above. The encoder 716 can be a physical device which is coupled to the CPU 712 through a communication channel. Alternatively, the encoder 716 can be represented by a software application (or a combination of software and hardware, e.g., application specific integrated circuits (ASIC)) which is loaded from a storage device and resided in the memory 712 of the computer. As such, the encoder 100 and 500 of the present invention can be stored on a computer readable medium, e.g., a memory or storage device.

The computer 710 can be coupled to a plurality of input and output devices 720, such as a keyboard, a mouse, a camera, a camcorder, a video monitor, any number of imaging devices or storage devices, including but not limited to, a tape drive, a floppy drive, a hard disk drive or a compact disk drive. The input devices serve to provide inputs to the computer for producing the encoded video bitstreams or to receive the sequence of video images from a storage device or an imaging device. Finally, a communication channel 730 is shown where the encoded signal from the encoding system is forwarded to a decoding system (not shown).

There has thus been shown and described a novel apparatus and method that selects a quantizer scale for each region or "object" within each frame to maintain the overall quality of the video image while optimizing the coding rate. Many changes, modifications, variations and other uses and applications of the subject invention will, however, become apparent to those skilled in the art after considering this specification and the accompanying drawings which disclose the embodiments thereof. All such changes, modifications, variations and other uses and applications which do not depart from the spirit and scope of the invention are deemed to be covered by the invention.

What is claimed is:

1. A method for allocating bits to encode a plurality of frames of an image sequence, each frame of said image sequence comprising a plurality of objects, said method comprising the steps of:
   (a) determining a target frame bit rate, T$_{frame}$, for each of the frames in accordance with a quantizer scale for each object in the frame;
   (b) allocating said target frame bit rate among the plurality of objects in accordance with the formula:

$$V_i = K_i \times T_{frame}$$

where V$_i$ is a target object bit rate for each object, and K$_i$ is proportional to an average pixel value for the object;
   (c) generating the quantizer scale for each of said plurality of objects in accordance with said target object bit rate, wherein said quantizer scale provides coarser and/or fewer allowed quantization values for a high frequency subband of said image sequence than for a low frequency subband of said image sequence; and
   (d) recursively adjusting the target frame bit rate for subsequent frames in the sequence.

2. The method of claim 1, further comprising determining said target object bit rate for each of the plurality of objects in accordance with a mean absolute difference (MAD) of said object.

3. The method of claim 1, further comprising adjusting said target object bit rate in accordance with a measure of a first in-first out (FIFO) buffer fullness.

4. The method of claim 1, further comprising allocating said target object bit rate to code syntax information, motion information, and shape information of the object.

5. The method of claim 4, further comprising adjusting said target object bit rate allocation to said shape information of said object.

6. The method of claim 1, further comprising the step of:
   (e) encoding said plurality of objects with said quantizer scale.

7. The method of claim 1, comprising determining said target frame bit rate from a remaining number of bits for the image sequence, a number of remaining frames in the image sequence, and/or a number of bits encoding a previous frame.

8. The method of claim 1, further comprising adjusting said target object bit rate in accordance with a buffer fullness measure.

9. The method of claim 8, further comprising skipping a next frame without encoding the next frame when a buffer fullness plus an estimated target frame bit rate of the next frame is above 80% of a size of the buffer.

10. The method of claim 9, further comprising updating the buffer fullness by a channel output rate, after skipping the next frame.

11. The method of claim 1, wherein said target frame bit rate is recursively adjusted by a polynomial regression process.

12. The method of claim 1, further comprising:
   estimating a complexity of a type of picture;
   deriving a predicted number of bits to code each frame from the estimated picture complexity; and
   calculating the quantizer scale for each frame in part in accordance with the complexity measure.

13. The method of claim 1, further comprising encoding each of the frames.

14. The method of claim 1, further comprising selecting said target object bit rate for each of the plurality of objects in accordance with mean absolute differences (MAD) of said plurality of objects.

15. The method of claim 14, further comprising producing said MAD for each of the objects from a sum of absolute differences (SAD) of the pixels of the object divided by the number of pixels in the object.

16. The method of claim 15, further comprising determining the absolute difference between pixel values in the original image and the corresponding pixel values in the predicted image for pixels in the object.

17. The method of claim 1, further comprising determining whether said target object bit rate is sufficient to code syntax information, motion information and shape information for said object.

18. The method of claim 17, further comprising incrementally or decrementally changing a number of bits allocated for shape coding.

19. The method of claim 17, further comprising increasing the target object bit rate when it is smaller than that necessary to code syntax information, motion information and shape information for the object in the previous frame, or decreasing the target object bit rate when it is greater than that necessary to code syntax information, motion information and shape information for the object in the previous frame.

20. The method of claim 1, wherein generating the quantizer scale comprises customizing a matrix of quantization values depending on characteristics of an intended display, a viewing distance and an amount of noise.

21. The method of claim 20, further comprising storing the customized quantization matrix as context with a compressed image sequence.

22. The method of claim 1, wherein the quantizer scale is further generated in accordance with a distortion measure that represents a mean absolute difference for a current object after performing motion compensation.

23. The method of claim 22, further comprising an instruction to compute the distortion measure by summing the differences between a current object and the same object in a previous frame from block to block and computing a mean absolute difference measure.

24. Apparatus for encoding frames of an image sequence, each frame comprising a plurality of objects, said apparatus comprising:
 a motion compensator for generating a predicted image of a current frame;
 a transform module for applying a transformation to a difference signal between the current frame and said predicted image, where said transformation produces a plurality of coefficients;
 a quantizer for quantizing said plurality of coefficients with at least one quantizer scale for each object in the frame; and
 a controller for generating the at least one quantizer scale for each of said plurality of objects in accordance with a target object bit rate, wherein said quantizer scale(s) provide coarser and/or fewer allowed quantization values for a high frequency subband of said image sequence than for a low frequency subband of said image sequence, selectively adjusting said at least one quantizer scale for the current frame in response to said target object bit rate for each of the plurality of objects, and determining said target object bit rate from a target frame bit rate, $T_{frame}$, in accordance with the formula:

$$V_i = K_i \times T_{frame}$$

where $V_i$ is a target object bit rate for each object, and $K_i$ is proportional to an average pixel value for the object.

25. The apparatus of claim 24, wherein said controller determines said target object bit rate for the plurality of objects in accordance with a mean absolute difference (MAD) of said object.

26. The apparatus of claim 24, wherein the quantizer scale comprises a matrix of quantization values that depend on characteristics of an intended display, a viewing distance and an amount of noise.

27. The apparatus of claim 24, further comprising a buffer having a size and a fullness, wherein said controller skips a next frame without encoding the next frame when the buffer fullness plus an estimated target frame bit rate of the next frame is above 80% of the size of the buffer.

28. A computer-readable medium having stored thereon a plurality of computer-executable instructions which, when executed by a processor, perform steps comprising:
 (a) determining a target frame bit rate, $T_{frame}$, for a frame in an image sequence in accordance with a quantizer scale for each object in the frame, wherein said each frame includes a plurality of objects; and
 (b) allocating said target frame bit rate among the plurality of objects in accordance with the formula:

$$V_i = K_i \times T_{frame}$$

where $V_i$ is a target object bit rate for each object, and $K_i$ is proportional to an average pixel value for the object;
 (c) generating the quantizer scale for each of said plurality of objects in accordance with said target object bit rate, wherein said quantizer scale provides coarser and/or fewer allowed quantization values for a high frequency subband of said image sequence than for a low frequency subband of said image sequence; and
 (d) recursively adjusting the target frame bit rate for each frame in the sequence.

29. The computer-readable medium of claim 28, further comprising an instruction to determine said target object bit rate for each of the plurality of objects in accordance with a means absolute difference (MAD) of said object.

30. The computer-readable medium of claim 28, further comprising an instruction to adjust said target object bit rate in accordance with a measure of a buffer fullness.

31. The computer-readable medium of claim 30, further comprising further comprising an instruction to skip a next frame without encoding the next frame when the buffer fullness plus an estimated target frame bit rate of the next frame is above 80% of a size of the buffer.

32. The computer-readable medium of claim 31, further comprising updating the buffer fullness by a channel output rate, after skipping the next frame.

33. The computer-readable medium of claim 28, further comprising an instruction to allocate said target object bit rate to code syntax information, motion information, and shape information of the object.

34. The computer-readable medium of claim 33, further comprising an instruction to adjust said target object bit rate allocation to said shape information of said object.

35. The computer-readable medium of claim 34, further comprising an instruction to store the customized quantization matrix as context with a compressed image sequence.

36. The computer-readable medium of claim 28, further comprising an instruction to perform the step of:
 (e) encoding said plurality of objects with said quantizer scale.

37. The computer-readable medium of claim 28, wherein generating the quantizer scale comprises customizing a matrix of quantization values depending on characteristics of an intended display, a viewing distance and an amount of noise.

38. The computer-readable medium of claim 28, further comprising an instruction to further generate the quantizer scale in accordance with a distortion measure that represents a mean absolute difference for a current object.

39. The computer-readable medium of claim 38, further comprising an instruction to compute the distortion measure by summing the difference between a current object and the same object in a previous frame from block to block and computing a mean absolute difference measure.

* * * * *